Patented Dec. 15, 1936

2,064,410

UNITED STATES PATENT OFFICE 2,064,410

SYNTHETIC PHENOL RESIN ADHESIVE

Albert Henry Bowen, Seattle, Wash., assignor to I. F. Laucks, Inc., Seattle, Wash., a corporation of Washington No Drawing. Application June 13, 1935, Serial No. 26,523

3 Claims. (Cl. 134—26)

The present invention relates to a dry powder base for thermo-setting phenolic aqueous glues and to the method of making wet glue from this base.

Certain phenol-formaldehyde resins are known to have exceptional properties when used as adhesives in the manufacture of plywood and the like. The use of these phenolic resins as wood glues has been retarded by the fact that they are water insoluble and any material that does not dissolve or at least disperse does not spread satisfactorily as an adhesive. By "disperse" I do not mean a suspension in a non-solvent medium wherein the particle size is made, by fine grinding, to approach the particle size in a true colloid. Such a suspension when spread on an absorbent medium such as wood immediately separates, the liquid being absorbed by the wood, and the solids left on the surface in a partially dry state. The solids cannot be made to spread evenly or adhere firmly to the surface on which they are spread.

To convert the resin to a spreadable form it may be dispersed in an aqueous solution of alkali such as caustic soda. The effect of the alkali is to first swell and then dissolve the resin until it becomes a viscous fluid. In this condition it may be spread on wood or any other surface by means of a brush or spreading rolls or any other device and leave a smooth, uniform, firmly adhering film. This manner of dispersing the resin, even though it makes commercial use possible, leaves something to be desired. The user must provide a mixer with good stirring action and be somewhat careful how the alkali is added. The alkali is a powerful reagent and slight errors in weighing may cause serious trouble.

The purpose of this invention is to simplify the procedure so as to provide the user with a dry powder adhesive base requiring only the addition of water with stirring to produce a fluid glue of excellent adhesive properties and capable of being properly spread.

To the accomplishment of the foregoing and related ends, the invention, then comprises the features hereinafter fully described, and particularly pointed out in the claims, the following description setting forth in detail certain illustrative embodiments of the invention, these being indicative however, of but few of the various ways, in which the principle of the invention may be employed.

As one example in illustration of my invention I may proceed as follows:

To 20 parts by weight of a dry powdered phenolic alkali-soluble resin are added 2 parts by weight of sodium metasilicate and the dry material is intimately mixed, preferably in a ball mill. This dry mixture has an indefinite life. 20 parts of this mixture are added to 25 parts by weight of water either cold or hot. The mixture is stirred until it is uniformly wet and then allowed to stand for 10 to 15 minutes. At the end of this time it will be found that the resin is well-dispersed, free from lumps and ready for application.

Various commercial potentially reactive phenol formaldehyde resins are suitable if they have not been cured beyond the alkali soluble state. The amount of metasilicate may be varied from a minimum of about 5 per cent to a maximum of about 30 per cent of the weight of the resin. The amount of metasilicate may be proportioned to the requirement of the individual resin as regards dispersion and to fluidity desired in the glue. The fluidity of the glue is in general reduced by an increase of metasilicate.

Manufacture of plywood using this glue may follow the method usual for other aqueous phenolic glues, including the steps of spreading the core stock with glue, drying out the glue film on the core stock, assembling with the face-stock and hot pressing the assembly to form the bond and convert the resin to the infusible, insoluble state.

Other modes of applying the principle of my invention may be employed, change being made as regards the details described, provided the features stated in the following claims, or the equivalent of such be employed.

I therefore particularly point out and distinctly claim as my invention:—

1. As a glue base an intimate mixture of an alkali soluble, reactive, thermo-setting phenolic resin powder with sodium metasilicate.

2. As a glue base an intimate mixture of an alkali soluble, reactive, thermo-setting phenolic resin powder and from five to thirty per cent of sodium metasilicate.

3. A spreadable aqueous glue comprising a sodium metasilicate dispersion of a potentially reactive thermo-setting phenolic resin.

ALBERT HENRY BOWEN.